(12) United States Patent
Spohn et al.

(10) Patent No.: US 11,609,891 B2
(45) Date of Patent: Mar. 21, 2023

(54) METHOD FOR ESTABLISHING NETWORK COMMUNICATION BY MEANS OF OPC UA

(71) Applicant: Endress+Hauser Process Solutions AG, Reinach (CH)

(72) Inventors: Hermann Spohn, Eimeldingen (DE); Tobias Zubler, Laufenburg (DE); Emilio Schiavi, Oberwil (CH)

(73) Assignee: Endress+Hauser Process Solutions AG, Reinach (CH)

( * ) Notice: Subject to any disclaimer, the term of this patent is extended or adjusted under 35 U.S.C. 154(b) by 48 days.

(21) Appl. No.: 17/282,037

(22) PCT Filed: Sep. 5, 2019

(86) PCT No.: PCT/EP2019/073750
§ 371 (c)(1),
(2) Date: Apr. 1, 2021

(87) PCT Pub. No.: WO2020/069816
PCT Pub. Date: Apr. 9, 2020

(65) Prior Publication Data
US 2021/0349869 A1   Nov. 11, 2021

(30) Foreign Application Priority Data

Oct. 1, 2018 (DE) ................ 10 2018 124 184.4

(51) Int. Cl.
*G06F 16/00* (2019.01)
*G06F 16/22* (2019.01)
(Continued)

(52) U.S. Cl.
CPC .......... *G06F 16/2228* (2019.01); *G06F 16/29* (2019.01); *H04L 67/306* (2013.01); *H04L 67/565* (2022.05)

(58) Field of Classification Search
CPC ... G06F 16/2228; G06F 16/29; H04L 67/306; H04L 67/565
See application file for complete search history.

(56) References Cited

U.S. PATENT DOCUMENTS

| 11,323,519 | B2 * | 5/2022 | Sherman | H04L 67/51 |
| 2007/0189166 | A1 * | 8/2007 | Johnson | H04L 41/0803 370/230 |

(Continued)

FOREIGN PATENT DOCUMENTS

| DE | 102010029952 A1 | 12/2011 |
| DE | 102011005062 A1 | 9/2012 |

(Continued)

OTHER PUBLICATIONS

Banerjee, M.Sc. Suprateek and Großmann, Prof. Dr.-Ing Daniel, An Electronic Device Description Language based approach for communication with DBMS and File System in an Industrial Automation Scenario, IEEE 978-1-5090-1314-2/16, 4 pp.

(Continued)

*Primary Examiner* — Noosha Arjomandi
(74) *Attorney, Agent, or Firm* — Kelly J. Smith; Endress+Hauser (USA) Holding, Inc.

(57) ABSTRACT

The disclosure includes a method for retrieving information stored in a cloud capable database. —A user has an OPC UA client, which is connected for communication with an OPC UA server, wherein the OPC UA server is used for the creating, aggregating and conforming of information models, wherein the OPC UA server interacts with an API for accessing the database, including: creating and loading a user-specific information model into the OPC UA server by using the configuration module, wherein the user-specific information model defines one or more pieces of information to be queried from the database; querying information defined in the user-specific information model from the (Continued)

database using the API and transferring the information from the API to the OPC UA server; converting the queried information into OPC UA-conforming structure data; and sending the structure data from the OPC UA server to the OPC UA client.

6 Claims, 1 Drawing Sheet

(51) Int. Cl.
*G06F 16/29* (2019.01)
*H04L 67/306* (2022.01)
*H04L 67/565* (2022.01)

(56) References Cited

U.S. PATENT DOCUMENTS

| | | | | |
|---|---|---|---|---|
| 2007/0211691 | A1* | 9/2007 | Barber | H04L 12/2854 370/351 |
| 2015/0381776 | A1* | 12/2015 | Seed | H04L 5/0055 709/203 |
| 2018/0088548 | A1 | 3/2018 | Sangi | |
| 2018/0309831 | A1* | 10/2018 | Sherman | H04L 67/125 |
| 2018/0359130 | A1* | 12/2018 | Zheng | E21B 44/00 |
| 2019/0042378 | A1* | 2/2019 | Wouhaybi | H04L 41/0895 |
| 2019/0109714 | A1* | 4/2019 | Clark | G06F 21/53 |
| 2019/0188192 | A1* | 6/2019 | Hayes | G06F 16/2462 |
| 2021/0182307 | A1* | 6/2021 | Ober | G06N 20/00 |
| 2021/0349869 | A1* | 11/2021 | Spohn | G06F 16/2228 |
| 2021/0373516 | A1* | 12/2021 | Shivamurthy | G05B 19/042 |
| 2022/0100171 | A1* | 3/2022 | Miller | G05B 19/4188 |

FOREIGN PATENT DOCUMENTS

| | | |
|---|---|---|
| EP | 1901145 A2 | 3/2008 |
| WO | 2009046095 A1 | 4/2009 |

OTHER PUBLICATIONS

Saez, Miguel, Lengieza, Steven, Maturana, Francisco, Barton, Kira and Tilbury, Dawn, A Data Transformation Adapter for Smart Manufacturing Systems with Edge and Cloud Computing Capabilities, IEEE, 978-1-5386-5398-2/18, 6 pp. (0519-0524).

Ghazivakili, Mohammad, Demartini, Claudio and Zunino, Claudio, Industrial Data-Collector by enabling OPC-UA standard for Industry 4.0, IEEE, 978-1-5386-1066-4/18, 8 pp.

International Electrotechnical Commission, OPC unified architecture—Part 1: Overview and concepts, IEC CS 65E: Devices and Integration in Enterprise Systems, Committee Diall (65E/605/CD), Project No. IEC TR 62541-1 ED3, Date of circulation: Jun. 29, 2018, 28 pp.

* cited by examiner

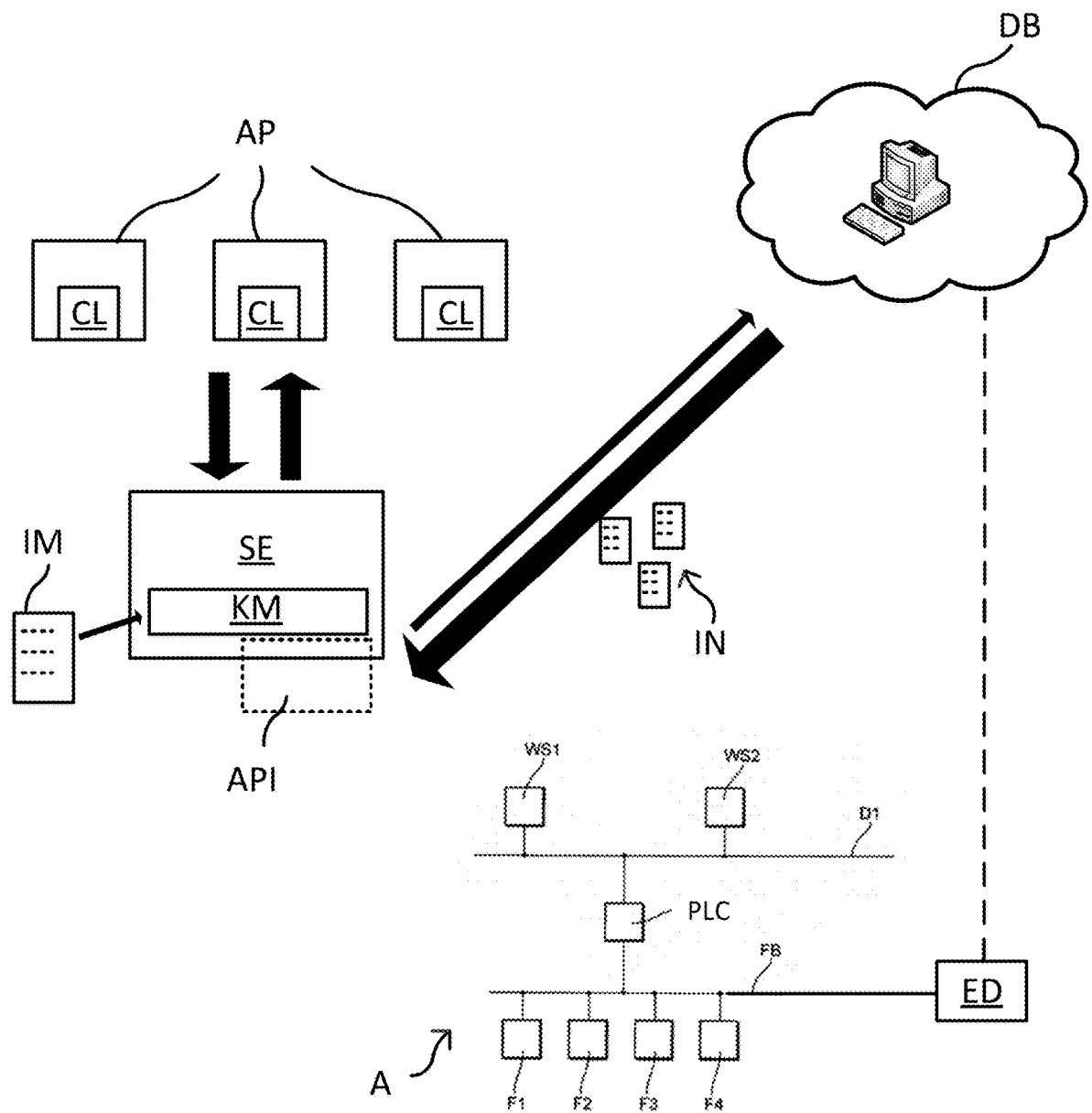

METHOD FOR ESTABLISHING NETWORK COMMUNICATION BY MEANS OF OPC UA

CROSS-REFERENCE TO RELATED APPLICATIONS

The present application is related to and claims the priority benefit of German Patent Application No. 10 2018 124 184.4, filed on Oct. 1, 2018 and International Patent Application No. PCT/EP2019/073750 filed on Sep. 5, 2019, the entire contents of which are incorporated herein by reference.

TECHNICAL FIELD

The invention relates to a method for user-specific retrieving of information stored in a cloud capable database, wherein information is present in the database as different information types and/or in different data formats, wherein user has an OPC UA client, which is connected for communication with an OPC UA server, wherein the OPC UA server has a configuration module, which is embodied for creating, aggregating and conforming information models, wherein the OPC UA server interacts with an API to the database defining requirements and commands for accessing the database.

BACKGROUND

Known in the state of the art are server, client systems, which utilize the OPC UA ("Open Platform Communications Unified Architecture") standard. This standard comprises an industrial machine-to-machine protocol, which is usable platform independently. An OPC UA server utilizing this standard provides data as structured information, which can be queried by an OPC UA client using this standard and applied in the most varied of applications.

In the context of "Industrial Internet of Things (IIoT)" and "Industry 4.0", increasingly data from industrial plants are stored in so-called cloud capable databases. A cloud-capable database is a database, which is compatible with cloud-computing technology. The terminology, cloud computing, means, in this case, the storing of information and the accessing of the stored information via Internet.

Used for accessing such a database and for exchange of data is the so-called API (Application Programming Interface). This defines the allowed commands and types of access for a database. Before the accessing, the API can require an authentication of the user. This authentication is usually implemented via a key (a so-called "API key").

In the present state of the art, there is no simple means, by which a user can retrieve data from a cloud via an OPC UA system in a granulated manner.

Based on the above, an object of the invention is to provide a method, which enables data to be retrieved from a cloud capable database via an OPC UA system.

SUMMARY

The object is achieved by a method for user-specific retrieving of information stored in a cloud capable database, wherein information is present in the database as different information types and/or in different data formats, wherein user has an OPC UA-client, which is connected for communication with an OPC UA server, wherein the OPC UA server has a configuration module, which is embodied for creating, aggregating and conforming information models, wherein the OPC UA server interacts with an API to the database defining requirements and commands for accessing the database, comprising:

creating and loading a user-specific information model into the OPC UA server by means of the configuration module, wherein the user-specific information model defines one or more pieces of information to be queried from the database;

querying information defined in the user-specific information model from the database by means of the API and transferring the information from the API to the OPC UA server;

converting the queried information into OPC UA-conforming structure data; and sending the structure data from the OPC UA server to the OPC UA-client.

An advantage of the method of the invention is that information structured for a user and defined by the user can be provided from a cloud-based database via a user's OPC UA system. The OPC UA server communicates with the database via an API. A provided information model tells the OPC UA server, which information it should query from the cloud. This queried information is then provided in structured information models (structure data) standardized in the OPC UA format. The user connects via its OPC UA client with the OPC UA server and can retrieve the structure data provided for it.

The OPC UA server can have a plurality of different APIs, wherein an API enables communication with one or more databases.

The cloud capable database can be a database of any type, in which information of any type can be stored.

In a preferred further development of the method of the invention, it is provided that in the course of creating the user-specific information module the availability of at least one piece of information to be queried in the database is checked by means of a ping query to the database. After a piece of information to be queried has been defined, an inquiry telegram is sent via the API appropriate for the information. In the case, in which the database has information of the fitting type, a positive response telegram is transmitted from the database. In the case, in which no information of fitting type is stored in the database, a negative response telegram, or no response telegram, is transmitted from the database.

In an advantageous embodiment of the method of the invention, it is provided that the information to be queried is assembled in the user-specific information model as nodes according to OPC UA specification, NodeSet 2.0.

In a preferred embodiment of the method of the invention, it is provided that the user-specific information model is created in a spreadsheet file format. For example, the specific information model is present in an Excel file format.

In an advantageous embodiment of the method of the invention, it is provided that information stored in the database is information created from components of a plant of automation technology. Of concern here is a plant of manufacturing automation or process automation, in which at least one product of predetermined quality and quantity is produced by automation from at least one reactant.

Alternatively, stored in the database can be any information of any type, for example, weather data, inventory data, etc.

In a preferred embodiment of the method of the invention, it is provided that the components are field devices and the information is at least information of at least one of the following categories:

process values collected from the field devices;
status-, or diagnostic information of the field devices;
information relative to geographical location of the field devices
device identifications of the field devices;
order status of the field devices at their manufacturers.

Known in the state of the art are field devices, which are used in industrial plants. In process automation technology, as well as in manufacturing automation technology, field devices are often applied. Referred to as field devices are, in principle, all devices, which are applied near to a process and which deliver, or process, process relevant information. Field devices are used for registering and/or influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or the fill level in a container. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In an advantageous embodiment of the method of the invention, it is provided that, before querying from the database the information defined in the user-specific information model, a key is transmitted to the API by means of the OPC UA server and checked for validity and wherein the information defined in the user-specific information model can only be queried, if the key is valid.

BRIEF DESCRIPTION OF THE DRAWING

The invention will now be explained in greater detail based on the appended drawing, the sole FIGURE of which shows as follows:

FIG. 1 shows an example of an embodiment of the method of the present disclosure.

DETAILED DESCRIPTION

Shown in FIG. 1 is an OPC UA system, composed of an OPC UA server SE and a plurality of OPC UA clients CL, which can communicate by means of a TCP/IP network. The clients CL are arranged at a user's location and are, in each case, part of the user-specific applications AP. These applications are, for example, a database of the user, one or more other applications, especially applications embodied for processing information and/or a human-machine interface (HMI) or a SCADA system.

The user is operator of a plant A of automation technology. In such a modern plant A, field devices F1, F2, F3, F4 are, as a rule, connected with superordinated units via communication networks, such as, for example, fieldbusses FB (Profibus®, Foundation® Fieldbus, HART®, etc.). The superordinated units are control units, such as, for example, a programmable logic controller PLC. The superordinated units PLC serve, among other things, for process control, as well as for commissioning of field devices F1, F2, F3, F4. The measured values registered by field devices F1, F2, F3, F4, especially by their sensors, are transmitted via their fieldbus FB to one or more superordinated unit(s) PLC, which, in given cases, process the measured values further and forward them via a data network D1 to the control station, composed of a number of work station PCs, WS1, WS2, of the plant A. The control station serves for process visualizing, process monitoring and process control via the superordinated units PLC. In addition, also a data transmission from the superordinated unit PLC via the fieldbus FB to the field devices F1, F2, F3, F4 is required, especially for configuration and parametering of field devices F1, F2, F3, F4, as well as for operation of actuators.

Moreover connected to the fieldbus FB is a so-called edge device ED. The edge device ED is embodied to monitor the information transmitted via the fieldbus FB from the field devices F1, F2, F3, F4, in given cases, to process such and to transfer such via the Internet to a cloud-capable database DB. Database DB stores this information along with additional field device relevant information. Examples of field device relevant information stored in the database are, for example:

process values collected from the field devices F1, F2, F3, F4;
status-, or diagnostic information of the field devices F1, F2, F3, F4;
information relative to geographical location of the field devices F1, F2, F3, F4;
device identifications of the field devices F1, F2, F3, F4, for example, serial number, manufacturer, or order code;
order status of field devices at their manufacturers,
as well as, calculated from this information, supplemental information, which are especially calculated by applications executed in the database DB.

In order that the user can utilize information stored in the database DB in its OPC UA system, such must be retrieved OPC UA-conformly from the database DB. The server SE includes for this a configuration module KM, in which one or more user-specific information models IM can be loaded. Such information model IM is typically in a spreadsheet file format and defines, which information IN is to be queried by the server SE from the database DB. The connection of the server SE to the database DB is controlled by an API defining accessing and allowed service telegrams of and for the database DB.

After authentication of the user for the database DB, the server SE works successively through the information model and obtains from the database DB the information defined in the information model. The information model IM is filled with the retrieved information and made available OPC UA-conformly as structure data. This structure data can then be downloaded by the clients CL and further processed, e.g. utilized by means of the applications AP.

The method shown in FIG. 1 is provided by way of example. Besides the described database, which contains information concerning a plant A of automation technology, any databases with any information types can be used.

The invention claimed is:

1. A method for specific retrieving of information stored in a cloud capable database, wherein information is present in the database as different information types and/or in different data formats, wherein user has an OPC UA client, which is connected for communication with an OPC UA server, wherein the OPC UA server has a configuration module, which is embodied for creating, aggregating and conforming information models, wherein the OPC UA server interacts with an API to the database defining requirements and commands for accessing the database, comprising:

creating and loading a user-specific information model into the OPC UA server using the configuration module, wherein the user-specific information model defines one or more pieces of information to be queried from the database;

querying information defined in the user-specific information from the database by using the API and transferring the information from the API to the OPC UA server;

converting the queried information into OPC UA-conforming structure data; and sending the structure data from the OPC UA server to the OPC UA client;

wherein, before querying from the database the information defined in the user-specific information model, a key is transmitted to the API using the OPC UA server and checked for validity and wherein the information defined in the user-specific information model can only be queried, if the key is valid.

2. The method of claim 1, wherein in the course of creating the user-specific information module the availability of at least one piece of information to be queried in the database is checked by using a ping query to the database.

3. The method of claim 1, wherein the information to be queried is assembled in the user-specific information model as nodes according to OPC UA specification NodeSet 2.0.

4. The method of claim 1, wherein the user-specific information model is created in a spreadsheet file format.

5. The method of claim 1, wherein information stored in the databases information created from components of a plan of automation technology.

6. The method of claim 1, wherein the components are field devices and the information is information of at least one of the following categories:
process values collected from the field devices;
status or diagnostic information of the field devices;
information relative to geographical location of the field devices;
device identifications of the field devices;
order status of the field devices at their manufacturers.

* * * * *